United States Patent
Jensen et al.

(10) Patent No.: US 11,855,938 B2
(45) Date of Patent: Dec. 26, 2023

(54) TOKENS IN A MESSAGING APPLICATION

(71) Applicant: Snap Inc., Santa Monica, CA (US)

(72) Inventors: John Jensen, Santa Monica, CA (US); Swetha Krishna Prabhakar, Los Altos Hills, CA (US)

(73) Assignee: Snap Inc., Santa Monica, CA (US)

( * ) Notice: Subject to any disclaimer, the term of this patent is extended or adjusted under 35 U.S.C. 154(b) by 42 days.

(21) Appl. No.: 17/400,643

(22) Filed: Aug. 12, 2021

(65) Prior Publication Data

US 2022/0150196 A1 May 12, 2022

Related U.S. Application Data

(60) Provisional application No. 63/198,780, filed on Nov. 12, 2020.

(51) Int. Cl.
*H04L 51/046* (2022.01)
*H04L 67/306* (2022.01)
(Continued)

(52) U.S. Cl.
CPC ............ *H04L 51/046* (2013.01); *A63F 13/87* (2014.09); *G06Q 20/363* (2013.01);
(Continued)

(58) Field of Classification Search
CPC ..... H04L 51/046; H04L 67/306; H04L 51/10; H04L 67/131; H04L 51/18; A63F 13/87; A63F 13/63; A63F 13/795; G06Q 20/363; G06Q 20/367; G06Q 20/381; G06Q 30/0207; G06Q 30/0246; G06Q 30/0274; G06Q 20/0655; G06Q 20/123; G06Q 20/145; G06Q 20/3678; G06Q 20/386; G06Q 20/389; G06Q 30/0277; G06Q 50/01
See application file for complete search history.

(56) References Cited

U.S. PATENT DOCUMENTS 9,066,200 B1 * 6/2015 Loxam .................. H04W 4/185
10,684,738 B1 * 6/2020 Sicora ................... G06F 16/435
(Continued)

FOREIGN PATENT DOCUMENTS

KR 20210127132 A * 11/2019 ............... H04L 9/50

OTHER PUBLICATIONS

"International Application Serial No. PCT US2021 058995, International Search Report dated Feb. 28, 2022", 4 pgs.
(Continued)

*Primary Examiner* — Alexandru Cirnu
(74) *Attorney, Agent, or Firm* — Schwegman Lundberg & Woessner, P.A.

(57) ABSTRACT

Aspects of the present disclosure involve a system and a method for performing operations comprising: receiving, by a messaging application, content from a given user; selecting a metric for measuring performance of the content on the messaging application; measuring performance of the content on the messaging application; computing a value of the performance of the content on the messaging application based on the selected metric; and updating a restricted use token wallet stored in a profile for the given user based on the computed value of the performance of the content.

20 Claims, 10 Drawing Sheets

(51) Int. Cl.
    *G06Q 30/0242*     (2023.01)
    *A63F 13/87*     (2014.01)
    *G06Q 30/0273*     (2023.01)
    *G06Q 20/38*     (2012.01)
    *G06Q 20/36*     (2012.01)
    *G06Q 30/0207*     (2023.01)

(52) U.S. Cl.
    CPC ......... *G06Q 20/367* (2013.01); *G06Q 20/381* (2013.01); *G06Q 30/0207* (2013.01); *G06Q 30/0246* (2013.01); *G06Q 30/0274* (2013.01); *H04L 67/306* (2013.01)

(56) References Cited

U.S. PATENT DOCUMENTS

| | | | | |
|---|---|---|---|---|
| 11,494,995 | B2* | 11/2022 | Berkebile | G06T 17/00 |
| 11,501,613 | B2* | 11/2022 | Bronicki | G06V 40/172 |
| 2007/0198422 | A1* | 8/2007 | Prahlad | G06Q 20/1235 |
| | | | | 705/52 |
| 2008/0070666 | A1* | 3/2008 | Gatto | G07F 17/3234 |
| | | | | 463/16 |
| 2008/0228580 | A1 | 9/2008 | Korman et al. | |
| 2008/0307454 | A1* | 12/2008 | Ahanger | H04N 21/854 |
| | | | | 725/36 |
| 2009/0132341 | A1* | 5/2009 | Klinger | G06Q 30/02 |
| | | | | 705/14.12 |
| 2009/0327057 | A1 | 12/2009 | Redlich | |
| 2012/0221406 | A1* | 8/2012 | Kruhoeffer | G06Q 30/02 |
| | | | | 705/14.66 |
| 2013/0290510 | A1* | 10/2013 | Klooster | G06Q 50/01 |
| | | | | 709/224 |
| 2013/0325572 | A1* | 12/2013 | Plut | G06Q 30/0241 |
| | | | | 705/14.69 |
| 2013/0346164 | A1* | 12/2013 | Ramamurti | G06Q 30/02 |
| | | | | 705/14.39 |
| 2014/0179412 | A1* | 6/2014 | Seabolt | A63F 13/335 |
| | | | | 463/25 |
| 2015/0086183 | A1* | 3/2015 | Sterchi | G11B 27/34 |
| | | | | 386/286 |
| 2015/0106446 | A1* | 4/2015 | Brophy | H04L 67/12 |
| | | | | 709/204 |
| 2020/0286119 | A1 | 9/2020 | Sullivan | |
| 2021/0312672 | A1* | 10/2021 | Luo | G06T 11/00 |
| 2022/0351270 | A1* | 11/2022 | Emmanuel | H04L 9/30 |

OTHER PUBLICATIONS

"International Application Serial No. PCT US2021 058995, Written Opinion dated Feb. 28, 2022", 6 pgs.

"International Application Serial No. PCT/US2021/058995, International Preliminary Report on Patentability dated May 25, 2023", 8 pgs.

* cited by examiner

TOKENS IN A MESSAGING APPLICATION

CLAIM OF PRIORITY

This application claims the benefit of priority to U.S. Provisional Application Ser. No. 63/198,780, filed Nov. 12, 2020, which is incorporated herein by reference in its entirety.

TECHNICAL FIELD

The present disclosure relates to the reward-based content creation on a messaging application.

BACKGROUND

Modern day user devices provide messaging applications that allow users to exchange messages with one another. Such messaging applications have recently started incorporating graphics in such communications. These messaging applications also allow users to create various types of content, such as videos, augmented reality items, and games.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some non-limiting examples are illustrated in the figures of the accompanying drawings in which.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments. It will be evident, however, to those skilled in the art, that embodiments may be practiced without these specific details. In general, well-known instruction instances, protocols, structures, and techniques are not necessarily shown in detail.

Typical systems allow users to create content and share such content with other users. Some systems have a reward mechanism by which users who create the content get rewarded, such as with direct payment of currency. The reward mechanisms of these systems are usually transparent, which results in users creating content that is tailored to maximize the reward they will receive. This reduces the quality and variety in the types of content the typical systems can offer.

The disclosed embodiments provide a restricted use token system that computes a value for a token based on a variety of performance metrics. In some cases, the performance metrics are hidden from the end users, which results in a greater variety of content being created. In other cases, performance metrics are specifically associated with certain features of the messaging application to increase content creation for such features. According to some embodiments, a messaging application receives content from a given user and selects a metric for measuring performance of the content on the messaging application. Performance of the content is measured, and a value of the performance is computed based on the selected metric. A restricted use token wallet stored in a profile for the given user is updated based on the computed value of the performance of the content. The tokens stored in the restricted use token wallet, in some implementations, can only be exchanged for real-world currency and cannot be sent to other users of the messaging application. In some cases, the tokens stored in the restricted use token wallet can only be exchanged for one or more usages in a list of allowable or previously approved usages, such as purchasing content from the messaging application, purchasing gaming applications, accessing purchase restricted features, upgrading features, and so forth. The token wallet is one example of how a set of tokens associated with a given user account can be stored.

Networked Computing Environment

Figure 1:
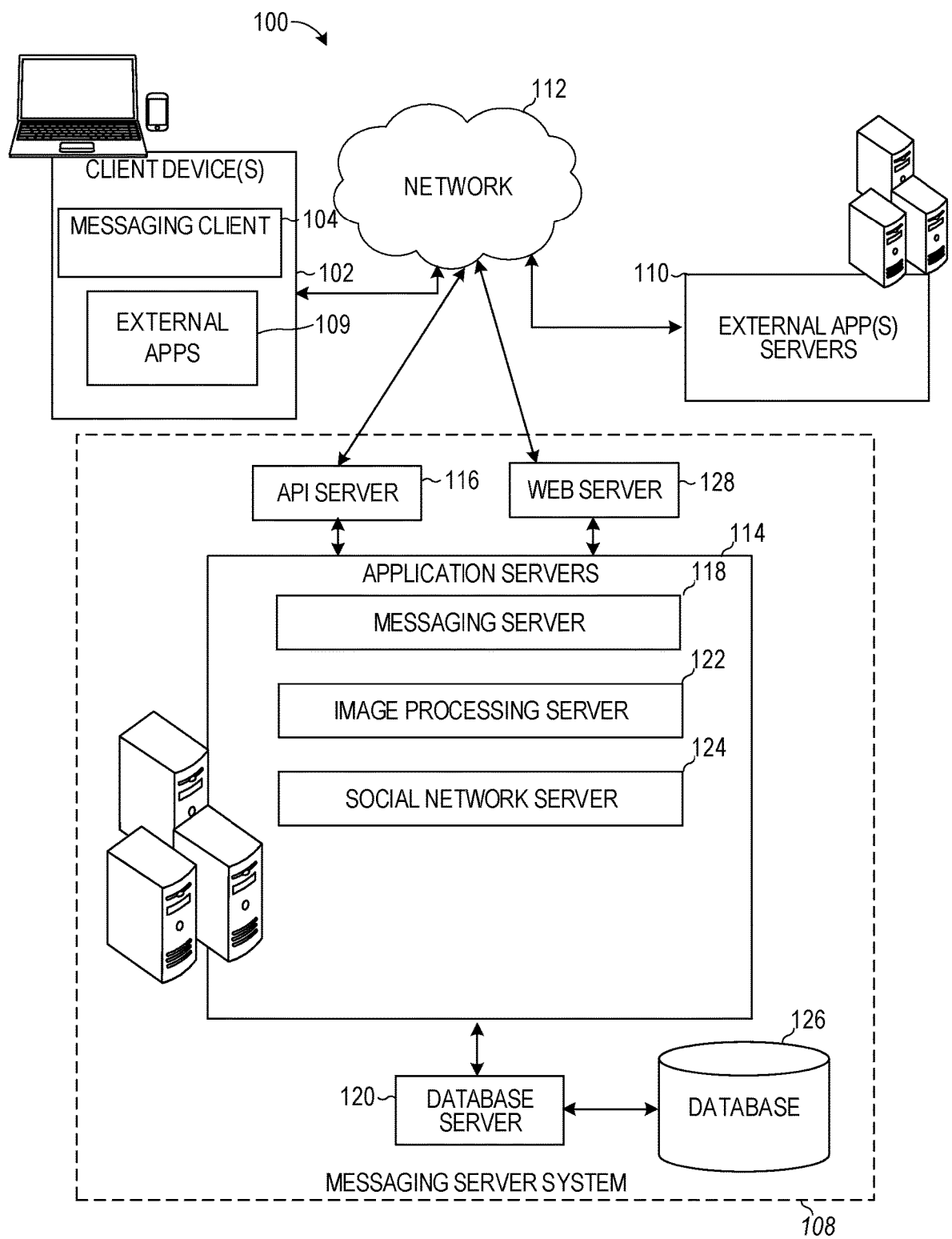
FIG. 1 is a diagrammatic representation of a networked environment in which the present disclosure may be deployed, in accordance with some examples.

FIG. 1 is a block diagram showing an example messaging system 100 for exchanging data (e.g., messages and associated content) over a network. The messaging system 100 includes multiple instances of a client device 102, each of which hosts a number of applications, including a messaging client 104 and other external applications 109 (e.g., third-party applications). Each messaging client 104 is communicatively coupled to other instances of the messaging client 104 (e.g., hosted on respective other client devices 102), a messaging server system 108 and external app(s) servers 110 via a network 112 (e.g., the Internet). A messaging client 104 can also communicate with locally-hosted third-party applications 109 using Applications Program Interfaces (APIs).

A messaging client 104 is able to communicate and exchange data with other messaging clients 104 and with the messaging server system 108 via the network 112. The data exchanged between messaging clients 104, and between a messaging client 104 and the messaging server system 108, includes functions (e.g., commands to invoke functions) as well as payload data (e.g., text, audio, video or other multimedia data).

The messaging server system 108 provides server-side functionality via the network 112 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 104.

Turning now specifically to the messaging server system 108, an Application Program Interface (API) server 116 is coupled to, and provides a programmatic interface to, application servers 114. The application servers 114 are communicatively coupled to a database server 120, which facilitates access to a database 126 that stores data associated with messages processed by the application servers 114. Similarly, a web server 128 is coupled to the application servers 114, and provides web-based interfaces to the application servers 114. To this end, the web server 128 processes incoming network requests over the Hypertext Transfer Protocol (HTTP) and several other related protocols.

The Application Program Interface (API) server 116 receives and transmits message data (e.g., commands and message payloads) between the client device 102 and the application servers 114. Specifically, the Application Program Interface (API) server 116 provides a set of interfaces (e.g., routines and protocols) that can be called or queried by the messaging client 104 in order to invoke functionality of the application servers 114. The Application Program Interface (API) server 116 exposes various functions supported by the application servers 114, including account registration, login functionality, the sending of messages, via the application servers 114, from a particular messaging client 104 to another messaging client 104, the sending of media files (e.g., images or video) from a messaging client 104 to a messaging server 118, and for possible access by another messaging client 104, the settings of a collection of media data (e.g., story), the retrieval of a list of friends of a user of a client device 102, the retrieval of such collections, the retrieval of messages and content, the addition and deletion of entities (e.g., friends) to an entity graph (e.g., a social graph), the location of friends within a social graph, and opening an application event (e.g., relating to the messaging client 104).

The application servers 114 host a number of server applications and subsystems, including for example a messaging server 118, an image processing server 122, and a social network server 124. The messaging server 118 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. Other processor- and memory-intensive processing of data may also be performed server-side by the messaging server 118, in view of the hardware requirements for such processing.

The application servers 114 also include an image processing server 122 that is dedicated to performing various image processing operations, typically with respect to images or video within the payload of a message sent from or received at the messaging server 118.

Figure 3:
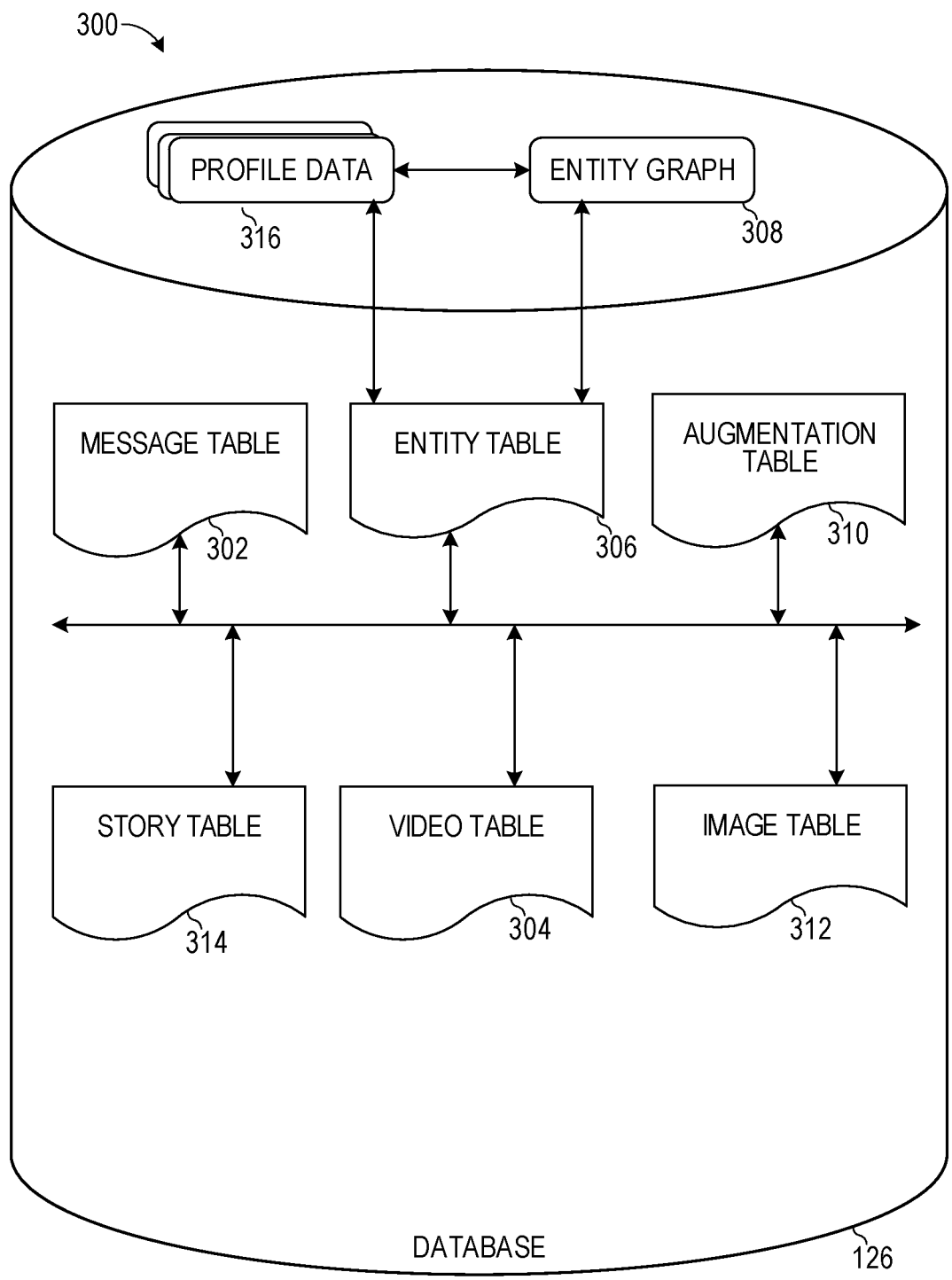
FIG. 3 is a diagrammatic representation of a data structure as maintained in a database, in accordance with some examples.

The social network server 124 supports various social networking functions and services and makes these functions and services available to the messaging server 118. To this end, the social network server 124 maintains and accesses an entity graph 308 (as shown in FIG. 3) within the database 126. Examples of functions and services supported by the social network server 124 include the identification of other users of the messaging system 100 with which a particular user has relationships or is "following," and also the identification of other entities and interests of a particular user.

Returning to the messaging client 104, features and functions of an external resource (e.g., an external application 109 or applet) are made available to a user via an interface of the messaging client 104. The messaging client 104 receives a user selection of an option to launch or access features of an external resource (e.g., a third-party resource), such as external apps 109. The external resource may be a third-party application (external apps 109) installed on the client device 102 (e.g., a "native app"), or a small-scale version of the third-party application (e.g., an "applet") that is hosted on the client device 102 or remote of the client device 102 (e.g., on external app(s) servers 110). The small-scale version of the third-party application includes a subset of features and functions of the third-party application (e.g., the full-scale, native version of the third-party standalone application) and is implemented using a markup-language document. In one example, the small-scale version of the third-party application (e.g., an "applet") is a web-based, markup-language version of the third-party application and is embedded in the messaging client 104. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource (external app 109), the messaging client 104 determines whether the selected external resource is a web-based external resource or a locally-installed external application. In some cases, external applications 109 that are locally installed on the client device 102 can be launched independently of and separately from the messaging client 104, such as by selecting an icon, corresponding to the external application 109, on a home screen of the client device 102. Small-scale versions of such external applications can be launched or accessed via the messaging client 104 and, in some examples, no or limited portions of the small-scale external application can be accessed outside of the messaging client 104. The small-scale external application can be launched by the messaging client 104 receiving, from a external app(s) server 110, a markup-language document associated with the small-scale external application and processing such a document.

In response to determining that the external resource is a locally-installed external application 109, the messaging client 104 instructs the client device 102 to launch the external application 109 by executing locally-stored code corresponding to the external application 109. In response to determining that the external resource is a web-based resource, the messaging client 104 communicates with the external app(s) servers 110 to obtain a markup-language document corresponding to the selected resource. The messaging client 104 then processes the obtained markup-language document to present the web-based external resource within a user interface of the messaging client 104.

The messaging client 104 can notify a user of the client device 102, or other users related to such a user (e.g., "friends"), of activity taking place in one or more external resources. For example, the messaging client 104 can provide participants in a conversation (e.g., a chat session) in the messaging client 104 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using a respective messaging client 104, with the ability to share an item, status, state, or location in an external resource with one or more members of a group of users into a chat session. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the messaging client 104. The external resource can selectively include different media items in the responses, based on a current context of the external resource.

The messaging client 104 can present a list of the available external resources (e.g., third-party or external applications 109 or applets) to a user to launch or access a given external resource. This list can be presented in a context-sensitive menu. For example, the icons representing different ones of the external application 109 (or applets) can vary based on how the menu is launched by the user (e.g., from a conversation interface or from a non-conversation interface).

System Architecture

Figure 2:
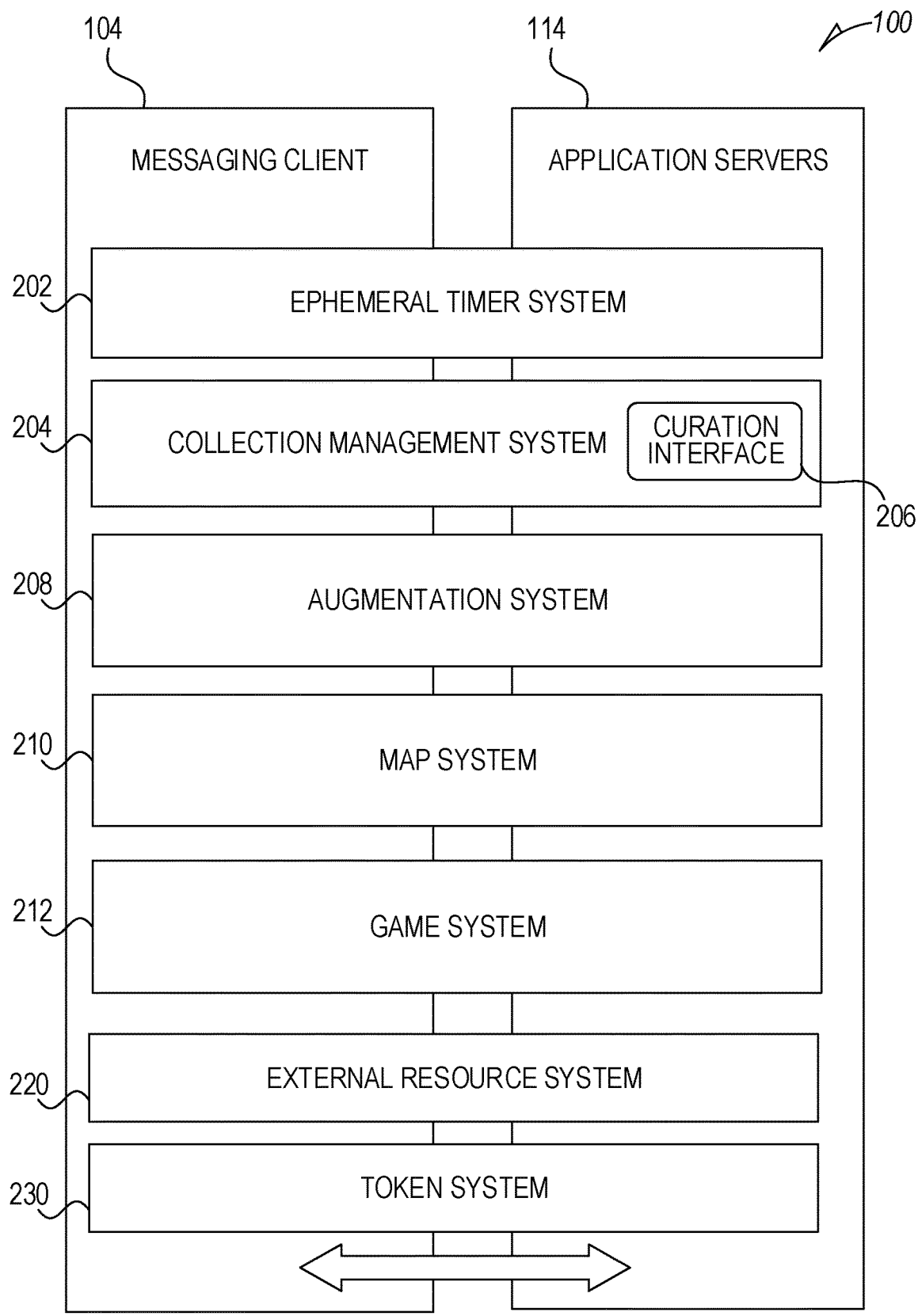
FIG. 2 is a diagrammatic representation of a messaging system, in accordance with some examples, that has both client-side and server-side functionality.

FIG. 2 is a block diagram illustrating further details regarding the messaging system 100, according to some examples. Specifically, the messaging system 100 is shown to comprise the messaging client 104 and the application servers 114. The messaging system 100 embodies a number of subsystems, which are supported on the client side by the messaging client 104 and on the sever side by the application servers 114. These subsystems include, for example, an ephemeral timer system 202, a collection management system 204, an augmentation system 208, a map system 210, a game system 212, and an external resource system 220.

The ephemeral timer system 202 is responsible for enforcing the temporary or time-limited access to content by the messaging client 104 and the messaging server 118. The ephemeral timer system 202 incorporates a number of timers that, based on duration and display parameters associated with a message, or collection of messages (e.g., a story), selectively enable access (e.g., for presentation and display) to messages and associated content via the messaging client 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 104.

The collection management system 204 furthermore includes a curation interface 206 that allows a collection manager to manage and curate a particular collection of content. For example, the curation interface 206 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 208 provides various functions that enable a user to augment (e.g., annotate or otherwise modify or edit) media content associated with a message. For example, the augmentation system 208 provides functions related to the generation and publishing of media overlays for messages processed by the messaging system 100. The augmentation system 208 operatively supplies a media overlay or augmentation (e.g., an image filter or augmented reality item) to the messaging client 104 based on a geolocation of the client device 102. In another example, the augmentation system 208 operatively supplies a media overlay to the messaging client 104 based on other information, such as social network information of the user of the client device 102. A media overlay may include audio and visual content and visual effects. Examples of audio and visual content include pictures, texts, logos, animations, and sound effects. The media overlay in some cases is referred to as an augmented reality item. An example of a visual effect includes color overlaying. The audio and visual content or the visual effects can be applied to a media content item (e.g., a photo) at the client device 102. For example, the media overlay may include text, a graphical element, or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 208 uses the geolocation of the client device 102 to identify a media overlay that includes the name of a merchant at the geolocation of the client device 102. The media overlay may include other indicia associated with the merchant. The media overlays may be stored in the database 126 and accessed through the database server 120.

In some examples, the augmentation system 208 provides a user-based publication platform that enables users to select a geolocation on a map and upload content associated with the selected geolocation. The user may also specify circumstances under which a particular media overlay should be offered to other users. The augmentation system 208 generates a media overlay that includes the uploaded content and associates the uploaded content with the selected geolocation.

In other examples, the augmentation system 208 provides a merchant-based publication platform that enables merchants to select a particular media overlay associated with a geolocation via a bidding process. For example, the augmentation system 208 associates the media overlay of the highest bidding merchant with a corresponding geolocation for a predefined amount of time. The augmentation system 208 communicates with the image processing server 122 to automatically select and activate an augmented reality experience related to an image captured by the client device 102. Once the augmented reality experience is selected, as the user scans images using a camera in the user's environment, one or more images, videos, or augmented reality graphical elements are retrieved and presented as an overlay on top of the scanned images. In some cases, the camera is switched to a front-facing view (e.g., the front-facing camera of the client device 102 is activated in response to activation of a particular augmented reality experience) and the images from the front-facing camera of the client device 102 start being displayed on the client device 102 instead of the rear-facing camera of the client device 102. The one or more images, videos, or augmented reality graphical elements are retrieved and presented as an overlay on top of the images that are captured and displayed by the front-facing camera of the client device 102.

The augmentation system 208 allows users to create custom media overlays or augmented reality items. Such media overlays may include one or more different feature types. For example, the media overlays may include the facial tracking-based features in which one or more augmented reality items are modified based on movement of facial features detected in a received or captured image or video. As another example, the media overlays may include the audio clip-based features in which a sound clip or audio clip is associated with one or more augmented reality items that are presented in a received or captured image or video. As another example, the media overlays may include the gyroscopic or accelerometer-based features in which one or more augmented reality items are modified based on movement of the client device 102 on which a received or captured image or video is displayed. The custom media overlays can be shared with other users of the messaging application. The other users can select to launch or access the custom media overlays. In response, the features of the custom media overlays are retrieved and used to augment or modify one or more images or videos presented on client devices of the other users.

The map system 210 provides various geographic location functions, and supports the presentation of map-based media content and messages by the messaging client 104. For example, the map system 210 enables the display of user icons or avatars (e.g., stored in profile data 316) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 104. A user can furthermore share his or her location and status information (e.g., using an appropriate status avatar) with other users of the messaging system 100 via the messaging client 104, with this location and status information being similarly displayed within the context of a map interface of the messaging client 104 to selected users.

The game system 212 provides various gaming functions within the context of the messaging client 104. The messaging client 104 provides a game interface providing a list of available games (e.g., web-based games or web-based applications) that can be launched by a user within the context of the messaging client 104, and played with other users of the messaging system 100. The messaging system 100 further enables a particular user to invite other users to participate in the play of a specific game, by issuing invitations to such other users from the messaging client 104. The messaging client 104 also supports both voice and text messaging (e.g., chats) within the context of gameplay, provides a leaderboard for the games, and also supports the provision of in-game rewards (e.g., coins and items).

The external resource system 220 provides an interface for the messaging client 104 to communicate with external app(s) servers 110 to launch or access external resources. Each external resource (apps) server 110 hosts, for example, a markup language (e.g., HTML5)-based application or small-scale version of an external application (e.g., game, utility, payment, or ride-sharing application that is external to the messaging client 104). The messaging client 104 may launch a web-based resource (e.g., application) by accessing the HTML5 file from the external resource (apps) servers 110 associated with the web-based resource. In certain examples, applications hosted by external resource servers 110 are programmed in JavaScript leveraging a Software Development Kit (SDK) provided by the messaging server 118. The SDK includes Application Programming Interfaces (APIs) with functions that can be called or invoked by the web-based application. In certain examples, the messaging server 118 includes a JavaScript library that provides a given third-party resource access to certain user data of the messaging client 104. HTML5 is used as an example technology for programming games, but applications and resources programmed based on other technologies can be used.

In order to integrate the functions of the SDK into the web-based resource, the SDK is downloaded by an external resource (apps) server 110 from the messaging server 118 or is otherwise received by the external resource (apps) server 110. Once downloaded or received, the SDK is included as part of the application code of a web-based external resource. The code of the web-based resource can then call or invoke certain functions of the SDK to integrate features of the messaging client 104 into the web-based resource.

The SDK stored on the messaging server 118 effectively provides the bridge between an external resource (e.g., third-party or external applications 109 or applets and the messaging client 104). This provides the user with a seamless experience of communicating with other users on the messaging client 104, while also preserving the look and feel of the messaging client 104. To bridge communications between an external resource and a messaging client 104, in certain examples, the SDK facilitates communication between external resource servers 110 and the messaging client 104. In certain examples, a WebViewJavaScriptBridge running on a client device 102 establishes two one-way communication channels between an external resource and the messaging client 104. Messages are sent between the external resource and the messaging client 104 via these communication channels asynchronously. Each SDK function invocation is sent as a message and callback. Each SDK function is implemented by constructing a unique callback identifier and sending a message with that callback identifier.

By using the SDK, not all information from the messaging client 104 is shared with external resource servers 110. The SDK limits which information is shared based on the needs of the external resource. In certain examples, each external resource server 110 provides an HTML5 file corresponding to the web-based external resource to the messaging server 118. The messaging server 118 can add a visual representation (such as box art or other graphic) of the web-based external resource in the messaging client 104. Once the user selects the visual representation or instructs the messaging client 104 through a GUI of the messaging client 104 to access features of the web-based external resource, the messaging client 104 obtains the HTML5 file and instantiates the resources necessary to access the features of the web-based external resource.

The messaging client 104 presents a graphical user interface (e.g., a landing page or title screen) for an external resource. During, before, or after presenting the landing page or title screen, the messaging client 104 determines whether the launched external resource has been previously authorized to access user data of the messaging client 104. In response to determining that the launched external resource has been previously authorized to access user data of the messaging client 104, the messaging client 104 presents another graphical user interface of the external resource that includes functions and features of the external resource. In response to determining that the launched external resource has not been previously authorized to access user data of the messaging client 104, after a threshold period of time (e.g., 3 seconds) of displaying the landing page or title screen of the external resource, the messaging client 104 slides up a menu (e.g., animates a menu as surfacing from a bottom of the screen to a middle of or other portion of the screen) for authorizing the external resource to access the user data. The menu identifies the type of user data that the external resource will be authorized to use. In response to receiving a user selection of an accept option, the messaging client 104 adds the external resource to a list of authorized external resources and allows the external resource to access user data from the messaging client 104. In some examples, the external resource is authorized by the messaging client 104 to access the user data in accordance with an OAuth 2 framework.

The messaging client 104 controls the type of user data that is shared with external resources based on the type of external resource being authorized. For example, external resources that include full-scale external applications (e.g., a third-party or external application 109) are provided with access to a first type of user data (e.g., only two-dimensional avatars of users with or without different avatar characteristics). As another example, external resources that include small-scale versions of external applications (e.g., web-based versions of third-party applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

The token system 230 receives content (e.g., videos, audio, gaming applications, augmented reality items, or combination thereof) from various users. The token system 230 selects a metric for measuring performance of the received content. The token system 230 measures the performance and then computes a value for the performance. The token system 230 updates a restricted use token wallet for the respective users who submitted the content to the token system 230. An example of the token system 230 is described in more detail in connection with FIG. 5 below.

Data Architecture

FIG. 3 is a schematic diagram illustrating data structures 300, which may be stored in the database 126 of the messaging server system 108, according to certain examples. While the content of the database 126 is shown to comprise a number of tables, it will be appreciated that the data could be stored in other types of data structures (e.g., as an object-oriented database).

The database 126 includes message data stored within a message table 302. This message data includes, for any particular one message, at least message sender data, message recipient (or receiver) data, and a payload. Further details regarding information that may be included in a message, and included within the message data stored in the message table 302, is described below with reference to FIG. 4.

An entity table 306 stores entity data, and is linked (e.g., referentially) to an entity graph 308 and profile data 316. Entities for which records are maintained within the entity table 306 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 308 stores information regarding relationships and associations between entities. Such relationships may be social, professional (e.g., work at a common corporation or organization) interested-based or activity-based, merely for example.

The profile data 316 stores multiple types of profile data about a particular entity. The profile data 316 may be selectively used and presented to other users of the messaging system 100, based on privacy settings specified by a particular entity. Where the entity is an individual, the profile data 316 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the messaging system 100, and on map interfaces displayed by messaging clients 104 to other users. The collection of avatar representations may include "status avatars," which present a graphical representation of a status or activity that the user may select to communicate at a particular time.

Where the entity is a group, the profile data 316 for the group may similarly include one or more avatar representations associated with the group, in addition to the group name, members, and various settings (e.g., notifications) for the relevant group.

The database 126 also stores augmentation data, such as overlays or filters, in an augmentation table 310. The augmentation data is associated with and applied to videos (for which data is stored in a video table 304) and images (for which data is stored in an image table 312).

Filters, in one example, are overlays that are displayed as overlaid on an image or video during presentation to a recipient user. Filters may be of various types, including user-selected filters from a set of filters presented to a sending user by the messaging client 104 when the sending user is composing a message. Other types of filters include geolocation filters (also known as geo-filters), which may be presented to a sending user based on geographic location.

For example, geolocation filters specific to a neighborhood or special location may be presented within a user interface by the messaging client 104, based on geolocation information determined by a Global Positioning System (GPS) unit of the client device 102.

Another type of filter is a data filter, which may be selectively presented to a sending user by the messaging client 104, based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 312 includes augmented reality content items (e.g., corresponding to applying lenses or augmented reality experiences). An augmented reality content item may be a real-time special effect and sound that may be added to an image or a video.

As described above, augmentation data includes augmented reality content items, overlays, image transformations, AR images, and similar terms that refer to modifications that may be applied to image data (e.g., videos or images). This includes real-time modifications, which modify an image as it is captured using device sensors (e.g., one or multiple cameras) of a client device 102 and then display on a screen of the client device 102 with the modifications. This also includes modifications to stored content, such as video clips in a gallery that may be modified. For example, in a client device 102 with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a three-dimensional mesh model of the object or objects, and using transformations and animated textures of the model within the video to achieve the transformation. In other examples, tracking of points on an object may be used to place an image or texture (which may be two dimensional or three dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of an object's elements, characteristic points for each element of the object are calculated (e.g., using an Active Shape Model (ASM) or other known methods). Then, a mesh based on the characteristic points is generated for each of the at least one elements of the object. This mesh is used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification, properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

Other methods and algorithms suitable for face detection can be used. For example, in some examples, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some examples, a computer animation model to transform image data can be used by a system where a user may capture an image or video stream of the user (e.g., a selfie) using a client device 102 having a neural network operating as part of a messaging client 104 operating on the client device 102. The transformation system operating within the messaging client 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transformation system initiates a process to convert the image of the user to reflect the selected modification icon (e.g., generate a smiling face on the user). A modified image or video stream may be presented in a graphical user interface displayed on the client device 102 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine-taught neural networks may be used to enable such modifications.

The graphical user interface, presenting the modification performed by the transformation system, may supply the user with additional interaction options. Such options may be based on the interface used to initiate the content capture and selection of a particular computer animation model (e.g., initiation from a content creator user interface). In various examples, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some examples, individual faces, among a group of multiple faces, may be individually modified, or such modifications may be individually toggled by tapping or selecting the individual face or a series of individual faces displayed within the graphical user interface.

A story table 314 stores data regarding collections of messages and associated image, video, or audio data, which are compiled into a collection (e.g., a story or a gallery). The creation of a particular collection may be initiated by a particular user (e.g., each user for which a record is maintained in the entity table 306). A user may create a "personal story" in the form of a collection of content that has been created and sent/broadcast by that user. To this end, the user interface of the messaging client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the messaging client 104, to contribute content to a particular live story. The live story may be identified to the user by the messaging client 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end user belongs to a specific organization or other entity (e.g., is a student on the university campus).

As mentioned above, the video table 304 stores video data that, in one example, is associated with messages for which records are maintained within the message table 302. Similarly, the image table 312 stores image data associated with messages for which message data is stored in the entity table 306. The entity table 306 may associate various augmentations from the augmentation table 310 with various images and videos stored in the image table 312 and the video table 304.

Data Communications Architecture

Figure 4:
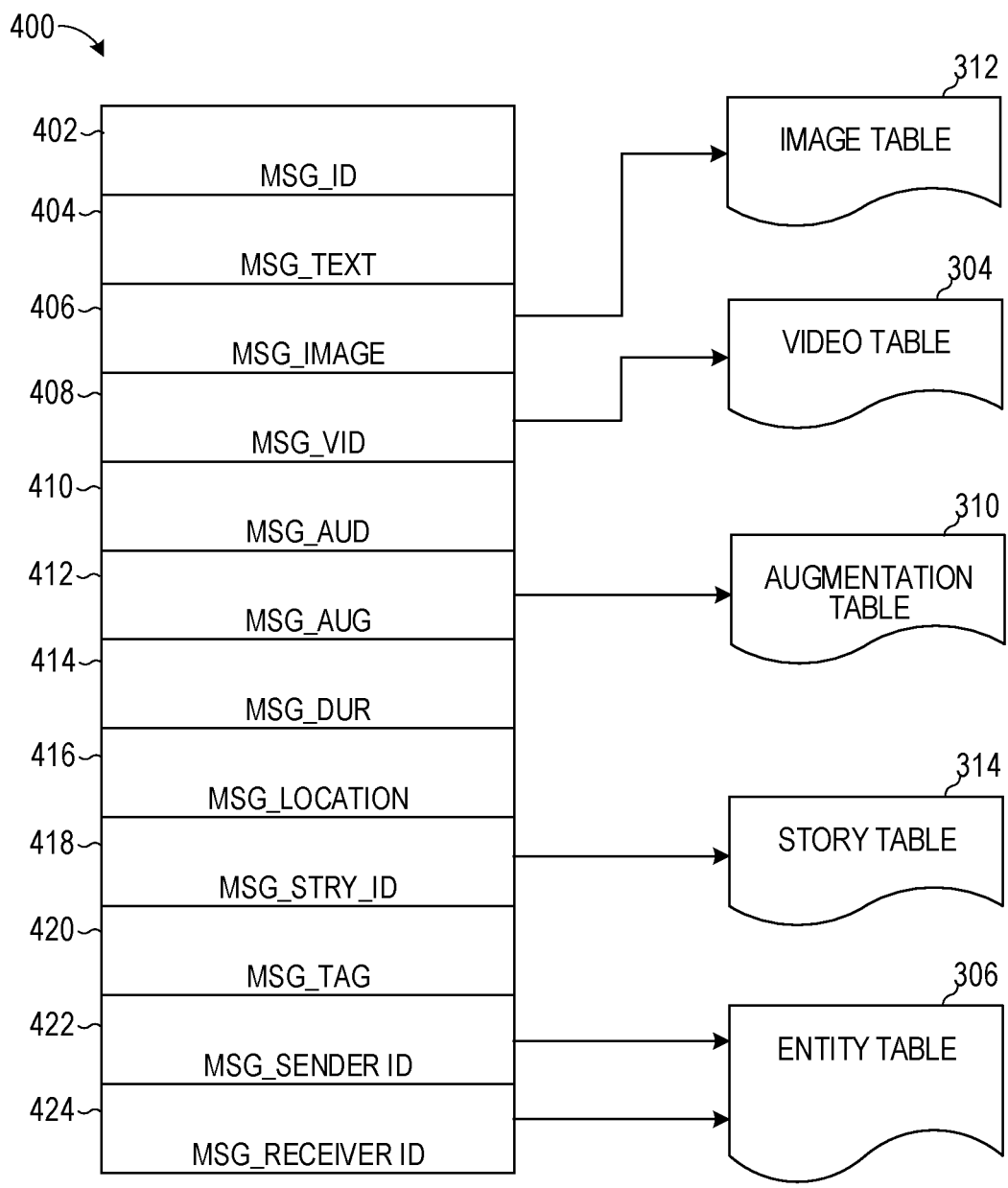
FIG. 4 is a diagrammatic representation of a message, in accordance with some examples.

FIG. 4 is a schematic diagram illustrating a structure of a message 400, according to some examples, generated by a messaging client 104 for communication to a further messaging client 104 or the messaging server 118. The content of a particular message 400 is used to populate the message table 302 stored within the database 126, accessible by the messaging server 118. Similarly, the content of a message 400 is stored in memory as "in-transit" or "in-flight" data of the client device 102 or the application servers 114. A message 400 is shown to include the following example components:

- message identifier 402: a unique identifier that identifies the message 400.
- message text payload 404: text, to be generated by a user via a user interface of the client device 102, and that is included in the message 400.
- message image payload 406: image data, captured by a camera component of a client device 102 or retrieved from a memory component of a client device 102, and that is included in the message 400. Image data for a sent or received message 400 may be stored in the image table 312.
- message video payload 408: video data, captured by a camera component or retrieved from a memory component of the client device 102, and that is included in the message 400. Video data for a sent or received message 400 may be stored in the video table 304.
- message audio payload 410: audio data, captured by a microphone or retrieved from a memory component of the client device 102, and that is included in the message 400.
- message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 310.
- message duration parameter 414: parameter value indicating, in seconds, the amount of time for which content of the message (e.g., the message image payload 406, message video payload 408, message audio payload 410) is to be presented or made accessible to a user via the messaging client 104.
- message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image within the message image payload 406, or a specific video in the message video payload 408).
- message story identifier 418: identifier values identifying one or more content collections (e.g., "stories" identified in the story table 314) with which a particular content item in the message image payload 406 of the message 400 is associated. For example, multiple images within the message image payload 406 may each be associated with multiple content collections using identifier values.
- message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.
- message sender identifier 422: an identifier (e.g., a messaging system identifier, email address, or device identifier) indicative of a user of the client device 102 on which the message 400 was generated and from which the message 400 was sent.
- message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 312. Similarly, values within the message video payload 408 may point to data stored within a video table 304, values stored within the message augmentation data 412 may point to data stored in an augmentation table 310, values stored within the message story identifier 418 may point to data stored in a story table 314, and values stored within the message sender identifier 422 and the message receiver identifier 424 may point to user records stored within an entity table 306.

Figure 5:
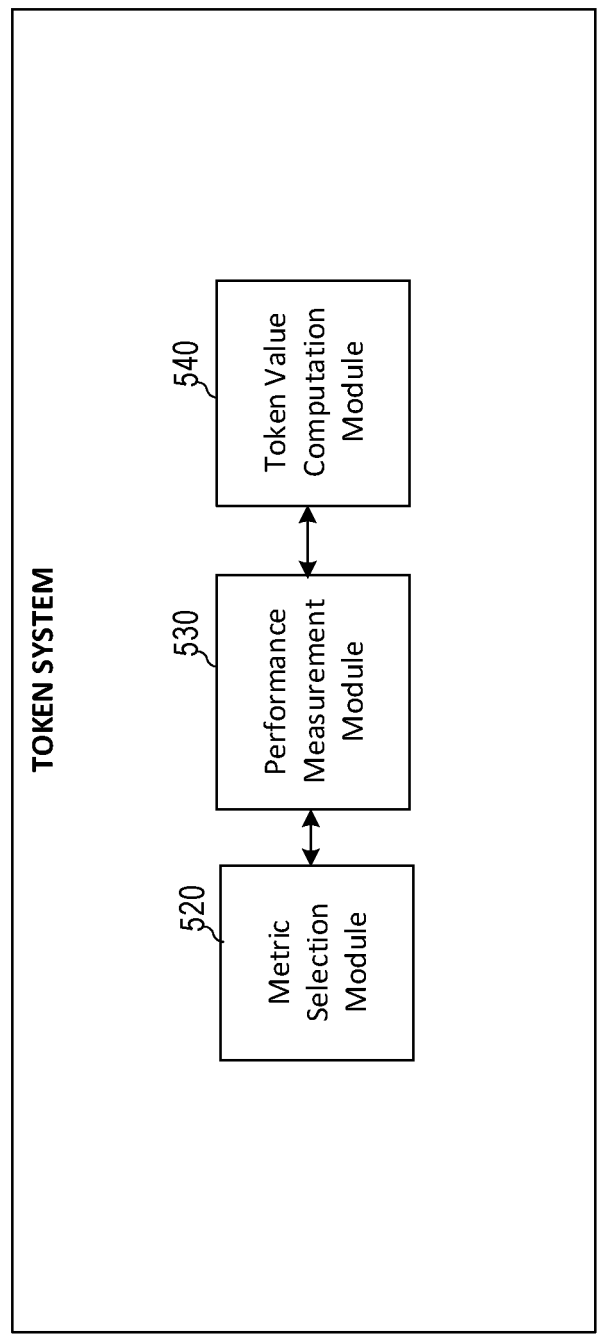
FIG. 5 illustrates the token system, in accordance with some examples.

FIG. 5 illustrates the token system 230 according to some embodiments. The token system 230 includes a metric selection module 520, a performance measurement module 530, and a token value computation module 540. In one example, the token system 230 receives content from a given user of the messaging application. Specifically, the given user can upload the content (e.g., a video, audio, gaming application, or augmented reality item) from the client device 102 of the given user to the token system 230.

The token system 230 identifies the type of content that has been received. For example, the token system 230 determines whether the received content is a video, audio, gaming application, or augmented reality item. The metric selection module 520 accesses a dynamically configurable database of metrics to obtain a metric for measuring performance of the type of content that has been received. In this way, performance of different types of content can be tracked differently As an example, the received content includes a video. In such cases, the metric selection module 520 selects a first metric for measuring performance of the video. The first metric may include a quantity of times the video has been viewed by other users on the messaging application. In this example, the performance measurement module 530 measures performance by updating a view count value each time the content is viewed at least partially by a unique user of the messaging application. This first metric may represent popularity of the video and may result in a value of performance of the video being computed in a first manner.

The first metric may also consider rarity of the video (e.g., attribute of the content). For example, if the video includes rare content (e.g., is associated with a geographical location or tag from which less than a threshold number of users submit content, depicts an object that is depicted in less than a threshold number of media items received from users, is manually identified as being rare by a moderator of the messaging application, or otherwise satisfies a rarity factor), the token count value may be computed in a given manner that results in a greater number of tokens being awarded to the given user than popular content. Specifically, content that exceeds a popularity threshold or has 1000 views may result in a first quantity of tokens being awarded to the given user and content that is determined to be rare and only have 100 views may result in a second quantity of tokens being awarded to the given user that is greater than the first quantity of tokens.

The token value computation module 540 computes the value of the performance according to a first computation rule associated with the first metric. The value computed by the token value computation module 540 corresponds to the number of tokens the given user is rewarded, namely the number or quantity of tokens by which a restricted use token wallet of the given user is incremented by the token value computation module 540.

In some implementations, the token value computation module 540 computes the value as a linear function corresponding to the measured quantity of times the video has been viewed. In such circumstances, the number of tokens output by the token value computation module 540 is directly related to the quantity of views or popularity of the video. Namely, if the video has been viewed 1000 times, the token value computation module 540 outputs a value of 1000 or a weighted value of 2000 (e.g., where the weight is 2) or a weighted value of 500 (e.g., where the weight is 0.5). In some implementations, the token value computation module 540 computes the value as an exponential or logarithmic function corresponding to the measured quantity of times the video has been viewed. In such circumstances, the number of tokens output by the token value computation module 540 increases gradually and levels off or decays exponentially as the quantity of views or popularity of the video increases. In some implementations, the token value computation module 540 computes the value as a step-wise function corresponding to the measured quantity of times the video has been viewed. In such circumstances, the number of tokens output by the token value computation module 540 is a first amount for a first quantity of views and is a second amount for a second quantity of views.

As an example, the received content includes a video with advertisements enabled. In such cases, the metric selection module 520 selects a second metric for measuring performance of the video. The second metric may include a quantity of advertisements inserted into the video over a threshold period of time (e.g., 24 hour period). In this example, the performance measurement module 530 measures performance by updating an advertisement count value each time a new advertisement is associated with the content. Such as, by updating the advertisement count each time a new advertisement replaces a prior advertisement that was associated with the content. This second metric may result in a value of performance of the video being computed in a second manner. The token value computation module 540 computes the value of the performance according to a second computation rule associated with the second metric. The second metric may also take into account the number of times the inserted advertisements have been viewed completely or partially by users who consume the content.

In some cases, the second metric also considers the feature of the messaging application that is used by the video. For example, if the video is submitted and exchanged by users in chat messages (where the video is privately exchanged by individual users), the first metric may be associated with a first weight for computing the value of the tokens. If the video is submitted and exchanged by users in a discovery screen (where the video is publicly viewable and searchable by any user of the messaging application), the first metric may be associated with a second weight for computing the value of the tokens that is greater than the first weight. In this way, popular videos that are shared publicly can result in a greater quantity of tokens being awarded to the given user versus popular videos that are only shared privately in messages.

In some implementations, the token value computation module 540 computes the value as a linear function corresponding to the measured quantity of advertisements inserted into the video. In such circumstances, the number of tokens output by the token value computation module 540 is directly related to the advertisements inserted into the video. In some implementations, the token value computation module 540 computes the value as an exponential or logarithmic function corresponding to the measured advertisements inserted into the video. In such circumstances, the number of tokens output by the token value computation module 540 increases gradually and levels off or decays exponentially as the quantity of advertisements inserted into the video increases. In some implementations, the token value computation module 540 computes the value as a step-wise function corresponding to the measured quantity of advertisements inserted into the video. In such circumstances, the number of tokens output by the token value computation module 540 is a first amount for a first quantity of advertisements inserted into the video and is a second amount for a second quantity of advertisements inserted into the video.

In some embodiments, the first and second metrics can be combined to measure performance of the video based on popularity (e.g., a first type of performance or attribute of the content) and based on number or quantity of advertisements inserted into the video (e.g., a second type of performance). In this circumstance, a first weight can be applied to a value output by the token value computation module 540 based on the popularity (attribute of the content) and a second weight can be applied to the value output by the token value computation module 540 based on the advertisement insertion. The weighted values can be combined (averaged or summed) into a total quantity of tokens by which the token wallet is updated by the token value computation module 540. In circumstances where users have selected to prevent advertisements from being inserted into the content, the performance and value is measured and computed solely based on the first metric.

As an example, the received content includes a gaming application. In such cases, the metric selection module 520 selects a third metric for measuring performance of the gaming application. The third metric may include a quantity of times the gaming application has been played or downloaded by other users on the messaging application. In this example, the performance measurement module 530 measures performance by updating a count value each time the gaming application is played or downloaded by a unique user of the messaging application. The count value may also be updated only after a particular user plays the gaming application for more than a threshold amount of time (e.g., more than 15 minutes). The third metric may also represent the duration of gameplay, which measures how long users spend playing the gaming application. This third metric may result in a token value computation being computed in a third manner. The token value computation module 540 computes the value of the performance according to a third computation rule associated with the third metric.

In some implementations, the token value computation module 540 computes the value as a linear function corresponding to the measured quantity of times the gaming application has been played or downloaded, or by the duration of gameplay of the gaming application. In such circumstances, the number of tokens output by the token value computation module 540 is directly related to the measured quantity of times the gaming application has been played or downloaded or the duration of gameplay of the gaming application. Namely, if the gaming application has been played 100 times, the token value computation module 540 outputs a value of 10 or a weighted value of 20 (e.g., where the weight is 2) or a weighted value of 5 (e.g., where the weight is 0.5). In some implementations, the token value computation module 540 computes the value as an exponential or logarithmic function corresponding to the measured quantity of times the gaming application has been played or downloaded or the duration of gameplay of the gaming application. In such circumstances, the number of tokens output by the token value computation module 540 increases gradually and levels off or decays exponentially as the quantity of times the gaming application has been played or downloaded or the duration of gameplay of the gaming application increases. In some implementations, the token value computation module 540 computes the value as a step-wise function corresponding to the measured quantity of times the gaming application has been played or downloaded or the duration of gameplay of the gaming application. In such circumstances, the number of tokens output by the token value computation module 540 is a first amount for a first measured quantity of times the gaming application has been played or downloaded or the duration of gameplay of the gaming application and is a second amount for a second measured quantity of times the gaming application has been played or downloaded or the duration of gameplay of the gaming application.

As an example, the received content includes an augmented reality item or element (e.g., a given attribute of the content). In such cases, the metric selection module 520 selects a fourth metric for measuring performance of the augmented reality item or element. The fourth metric may include a quantity of times the augmented reality item or element has been used by other users on the messaging application to modify or augment content captured by their respective client devices 102. In this example, the performance measurement module 530 measures performance by updating a count value each time the augmented reality item or element is accessed or used by a unique user of the messaging application. This fourth metric may result in a token value computation being computed in a fourth manner. The token value computation module 540 computes the value of the performance according to a fourth computation rule associated with the fourth metric.

In some implementations, the token value computation module 540 computes the value as a linear function corresponding to the measured quantity of times the augmented reality item or element has been used. In such circumstances, the number of tokens output by the token value computation module 540 is directly related to the measured quantity of times the augmented reality item or element has been used by the other users. In some implementations, the token value computation module 540 computes the value as an exponential or logarithmic function corresponding to the measured quantity of times the augmented reality item or element has been used by the other users. In such circumstances, the number of tokens output by the token value computation module 540 increases gradually and levels off or decays exponentially as the quantity of times the augmented reality item or element has been used by the other users. In some implementations, the token value computation module 540 computes the value as a step-wise function corresponding to the measured quantity of times the augmented reality item or element has been used by the other users.

The function used to compute the value for the tokens according to any of the metrics above and below can change over time and based on a need of the messaging application. For example, the token value computation module 540 may compute the value as a linear function during a first time period (e.g., on certain weekdays) and may compute the value using the logarithmic function during a second time period (e.g., on weekends). As another example, the token value computation module 540 may compute the value as a linear function when there is a need to increase compensation for content that corresponds to the first metric (e.g., for video content) and may compute the value using the logarithmic function to disincentivize the content that corresponds to the first metric (e.g., for video content). As another example, the token value computation module 540 may compute the value as a linear function when there is a need to increase compensation for content that corresponds to the first metric (e.g., for video content) and may compute the value using the logarithmic function to disincentivize the content that corresponds to the third metric (e.g., for gaming applications).

In some implementations, the fourth computation rule may specify different weights to be applied to the value computed by the token value computation module 540 based on the types of features that the augmented reality item or element includes. For example, a first weight may be associated with the token count value that is computed based on use of the augmented reality item or element when the augmented reality item or element includes a first type of feature (e.g., a facial tracking response-based feature where augmented reality graphical elements are modified based on movement of a face depicted in one or more images captured and displayed by the client device 102). A second weight may be associated with the token count value that is computed based on use of the augmented reality item or element when the augmented reality item or element includes a second type of feature (e.g., an accelerometer or gyroscopic response-based feature where augmented reality graphical elements are modified based on movement of the client device 102 on which they are displayed). A third weight may be associated with the token count value that is computed based on use of the augmented reality item or element when the augmented reality item or element includes the first and the second types of features. The third weight may be greater than the second weight, which may be greater than the first weight. In some instances, the third weight may be smaller than the second weight, which may be smaller than the first weight.

In some embodiments, a second user may access the content that is provided by the given user to the token system 230. The second user may purchase a virtual item (e.g., a dancing hat) for a given amount of real-world currency. The second user may choose to send the virtual item directly to the given user who created the content as a reward. The token system 230 may receive the virtual item and remove the virtual item from the account associated with the second user to prevent the second user from sending the virtual item more than once to the same or different user. The token system 230 may retrieve one of the performance metrics (e.g., the first, second, third or fourth performance metrics) and may convert the virtual item to a token value based on the type of virtual item and the retrieved performance metric. After converting the virtual item to the token value, the token system 230 may update or increment the restricted use token wallet balance based on the token value (e.g., the token system 230 may increase the restricted use token balance for the given user by the token value amount).

In some implementations, the token system 230 may determine the amount of the token value that corresponds to the virtual item based on an exchange rate. Specifically, the token system 230 may retrieve a static or dynamic exchange rate associated with the virtual item. The token system 230 may determine the current token value that corresponds to the virtual item based on the retrieved exchange rate. The token system 230 may retrieve the function based on the selected metric for the content. The token system 230 may then increment or decrement or adjust the current value of the token based on the retrieved function and may update the restricted use token balance based on the adjusted current value of the token. In this way, if a given user is rewarded with a virtual item (e.g., a dancing hat) for submitting a popular video, the given user may be provided with a first amount of tokens corresponding to the virtual item because the popular video is associated with the first metric. As another example, if a given user is rewarded with the same virtual item (e.g., a dancing hat) for submitting a popular video that is not associated with advertisements, the given user may be provided with a second amount of tokens corresponding to the virtual item because the popular video not associated with advertisements is associated with the second metric. As another example, if a given user is rewarded with the same virtual item (e.g., a dancing hat) for submitting a popular augmented reality item or experience, the given user may be provided with a third amount of tokens corresponding to the virtual item because the augmented reality item is associated with the third metric. As such, the same virtual item may be converted to different amounts of tokens to reward users who generate content on the basis of the type of content and the type of performance metric associated with the content. The performance metric that is used to convert the virtual item may change dynamically over time.

The given user may be associated with different types of wallets or collections of tokens. One type of wallet can only store restricted use tokens which is updated based on content the given user produces. The restricted use tokens can only be exchanged by the given user for fiat currency or can only be used for a specified purpose defined by the messaging application. Another type of wallet associated with the given user may store free to use tokens. These tokens can be purchased by the user or earned in some other way (such as by consuming advertisements or winning games or advancing levels in a game). Free to use tokens may be used by the user to purchase any digital or tangible good. The free to use tokens can also be used to purchase virtual goods or advancing levels in a game. Free to use tokens can be sent to other users of the messaging application and credited to the free to use token wallets of the recipients. Free to use tokens cannot be exchanged or credited to the restricted use tokens. Namely, if a given user receives a free to use token, that free to use token cannot be exchanged for fiat currency or exchanged for restricted use tokens.

Figure 6:
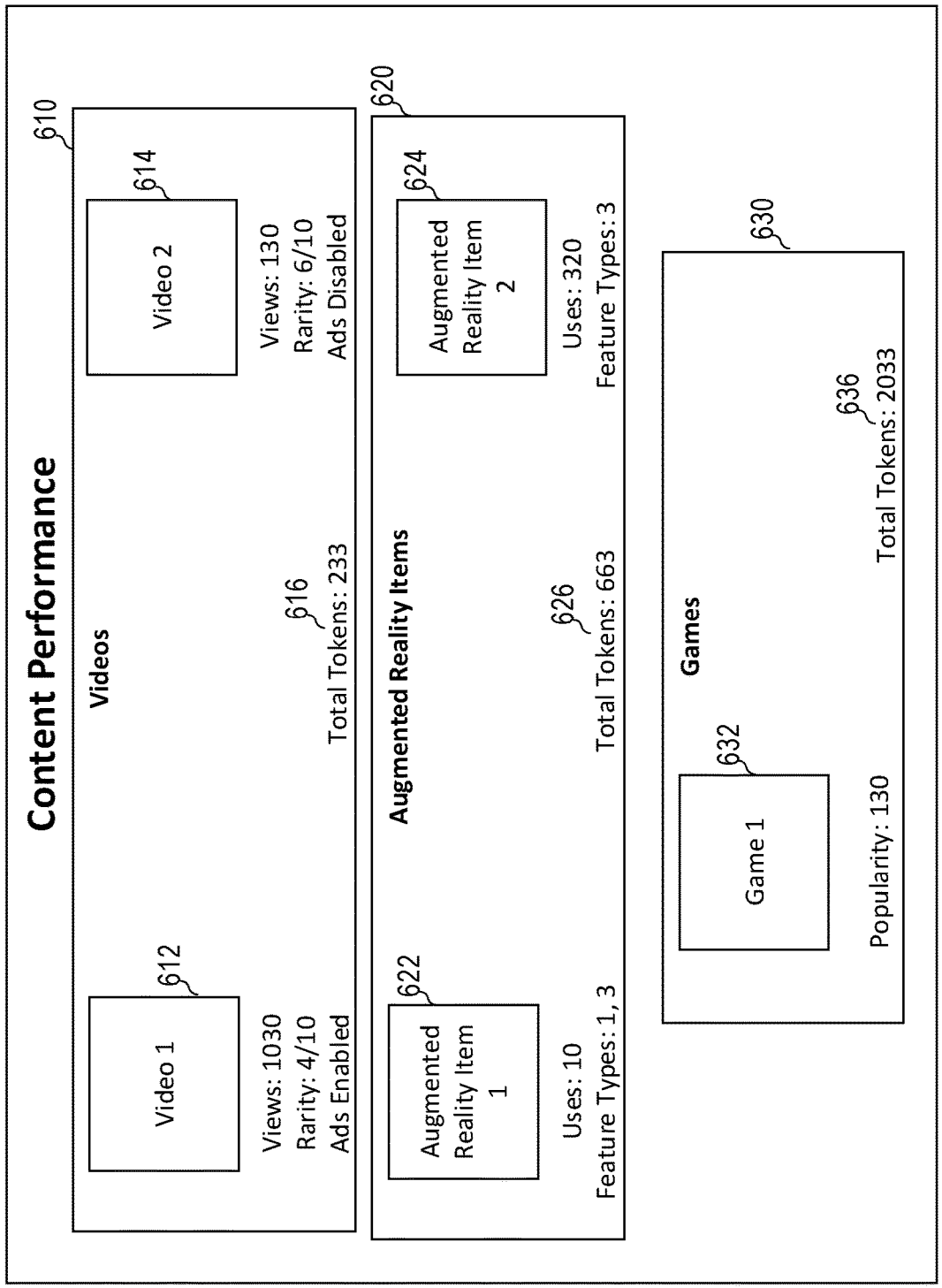
FIG. 6 is a diagrammatic representation of a graphical user interface of the token system, in accordance with some examples.

FIG. 6 is a diagrammatic representation of a graphical user interface 600 of the token system 230, in accordance with some examples. The graphical user interface 600 may be presented to a given user who creates and submits content to the token system 230. The graphical user interface 600 may show the given user how many tokens have been computed and provided to the given user for each type of content the given user submits.

As an example, a first region 610 may include a plurality of videos including a first video 612 and a second video 614. Each video shown in the first region 610 may have been previously created by the given user and submitted to the messaging application. The first region 610 may present metrics or statistics for each video. The metrics or statistics may include the number of views indicating popularity of the videos, a rarity factor indicating how rare the content shown in the videos has been determined to be, and an indication of whether advertisements are enabled or disabled for the given video. The user can toggle the advertisements parameter to start associating advertisements with the video (e.g., the second video 614) or to stop associating advertisements with the video. In some circumstances, if advertisements are enabled, then the second metric may be used to compute the count value for the tokens and to measure performance of the video and optionally compute the first metric in combination with the second metric. In some circumstances, if advertisements are disabled, then the first metric may be used to compute the count value for the tokens and to measure performance of the video. A running total 616 is provided in the first region 610 to indicate how many tokens the given user has gained or earned from the plurality of videos the user submitted that are included in the first region 610.

As another example, a second region 620 may include a plurality of augmented reality items or elements (experiences) including a first augmented reality item 622 and a second augmented reality item 624. Each augmented reality item shown in the second region 620 may have been previously created by the given user and submitted to the messaging application. The second region 620 may present metrics or statistics for each augmented reality item. The metrics or statistics may include the number of times each respective augmented reality item was used by another user of the messaging application and the number and types of features included by the associated augmented reality item. A running total 626 is provided in the second region 620 to indicate how many tokens the given user has gained or earned from the plurality of augmented reality items the user submitted that are included in the second region 620.

As another example, a third region 630 may include a plurality of gaming applications including a first gaming application 632. Each gaming application shown in the third region 630 may have been previously created by the given user and submitted to the messaging application. The third region 630 may present metrics or statistics for each gaming application. The metrics or statistics may include the popularity of each gaming application, such as the number of users who used or downloaded the respective gaming application and the amount of time spent by all of the users or a weighted average of the users playing the gaming application. A running total 636 is provided in the third region 630 to indicate how many tokens the given user has gained or earned from the plurality of gaming applications the user submitted that are included in the third region 630.

Figure 7:
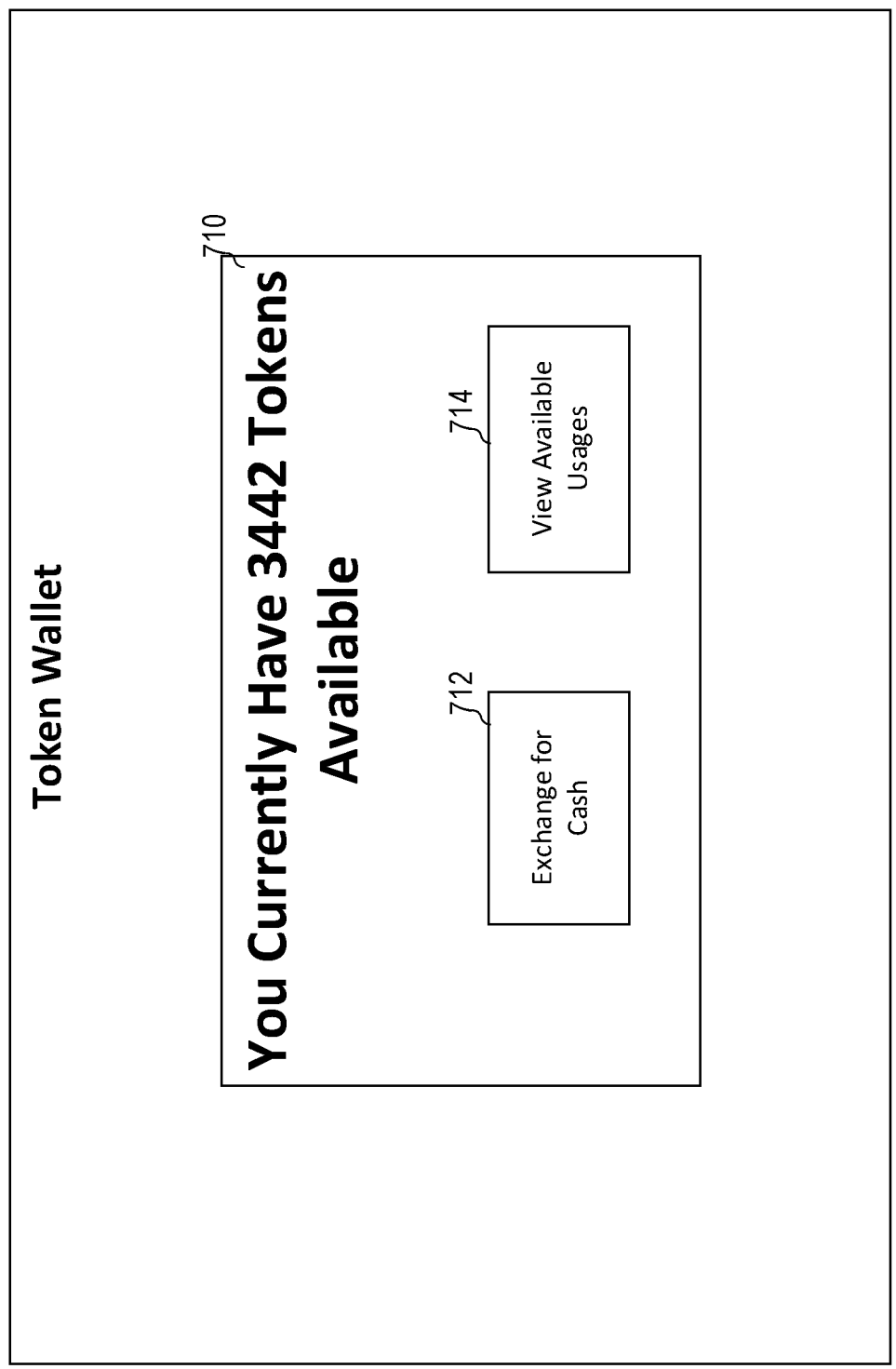
FIG. 7 is a diagrammatic representation of a graphical user interface of the token system, in accordance with some examples.

FIG. 7 is a diagrammatic representation of a graphical user interface 700 of the token system 230, in accordance with some examples. The graphical user interface 700 includes a token wallet balance region 710. The token wallet balance region 710 specifies the total number of restricted use tokens the user currently has in the user's wallet that is stored and maintained in the user profile by the messaging application.

An exchange for cash option 712 may be included in the graphical user interface 700. In response to receiving a user selection of the option 712, the messaging application may retrieve an exchange rate associated with cashing out the tokens for real-world currency. The exchange rate may vary over time and specifies how many tokens each real-world currency (e.g., U.S. dollar) is worth. After obtaining the exchange rate, the token system 230 clears out or depletes all the tokens that are in the wallet (or a specified number of tokens indicated by the user) and converts the tokens to real-world currency according to the exchange rate. The token system 230 then schedules a deposit to a bank account associated with the given user.

In some embodiments, the restricted use tokens represented by the token wallet balance region 710 can only be exchanged or used for a single usage or purpose. The single usage or purpose may be exclusive to the conversion to real-world currency and the tokens cannot, in such cases, be sent or shared with another user of the messaging application. In some embodiments, a list of approved or allowable usages can be presented to the user in response to receiving a user selection of the view available usages option 714. Such approved or allowable usages may include purchasing content (filters, images, sounds clips, videos, features, and so forth) from the messaging application, purchasing gaming applications, accessing purchase-restricted features, upgrading features, and so forth. The user can select a usage from the list of usages that are presented and may be provided an option to exchange the balance of the tokens for the approved and allowable usage. Each usage may be associated with a different exchange rate. As such, the token system 230 retrieves the current exchange rate for the selected usage and may then convert the balance of the tokens in the wallet to the selected usage according to he current exchange rate associated with the selected usage.

Figure 8:
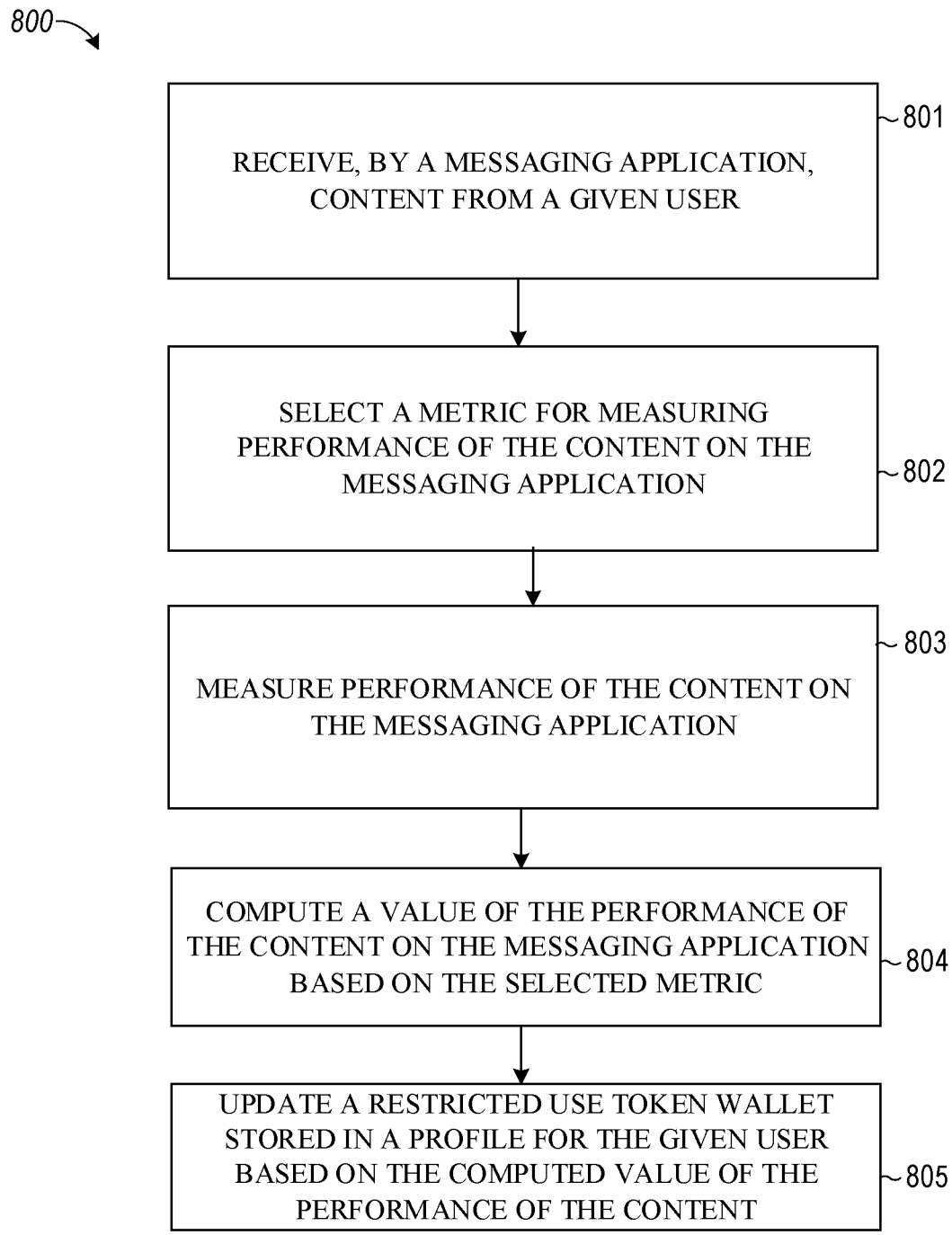
FIG. 8 is a flowchart illustrating example operations of the messaging application server, according to example embodiments.

FIG. 8 is a flowchart illustrating example operations of the messaging client 104 in performing process 800, according to example embodiments. The process 800 may be embodied in computer-readable instructions for execution by one or more processors such that the operations of the process 800 may be performed in part or in whole by the functional components of the messaging server system 108; accordingly, the process 800 is described below by way of example with reference thereto. However, in other embodiments at least some of the operations of the process 800 may be deployed on various other hardware configurations. The operations in the process 800 can be performed in any order, in parallel, or may be entirely skipped and omitted.

At operation 801, the token system 230 receives content from a given user. For example, the token system 230 receives a video, augmented reality item, audio, or gaming application from a given user.

At operation 802, the token system 230 selects a metric for measuring performance of the content on the messaging application. For example, the token system 230 selects one or a combination of the first, second, third, or fourth metric for measuring performance of the content on the messaging application. Specifically, if the content is a video, the token system 230 selects the first metric that measures popularity of the video as performance.

At operation 803, the token system 230 measures performance of the content on the messaging application. For example, the token system 230 measures how many users have viewed or accessed the content or if the content includes certain features or feature types.

At operation 804, the token system 230 computes a value of the performance of the content on the messaging application based on the selected metric. For example, the token system 230 obtains the token computation mechanism associated with the selected rule for computing how many tokens a given performance is worth, such as using a linear or logarithmic function.

At operation 805, the token system 230 updates a restricted use token wallet stored in a profile for the given user based on the computed value of the performance of the content. For example, the token system 230 updates the token balance represented in the graphical user interface 700 by incrementing the token balance by the computed value of the performance of the content.

Machine Architecture

Figure 9:
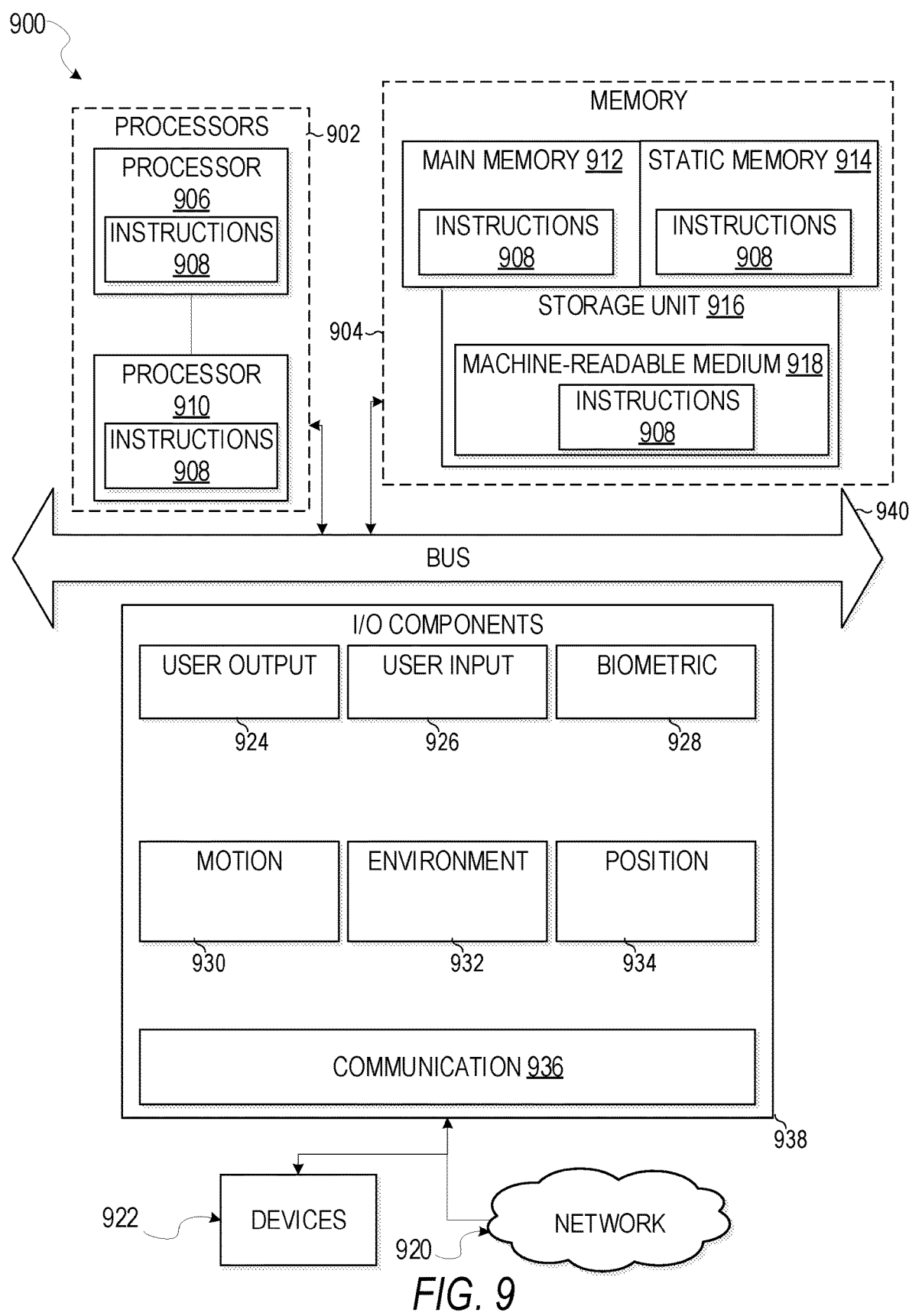
FIG. 9 is a diagrammatic representation of a machine in the form of a computer system within which a set of instructions may be executed for causing the machine to perform any one or more of the methodologies discussed herein, in accordance with some examples.

FIG. 9 is a diagrammatic representation of the machine 900 within which instructions 908 (e.g., software, a program, an application, an applet, an app, or other executable code) for causing the machine 900 to perform any one or more of the methodologies discussed herein may be executed. For example, the instructions 908 may cause the machine 900 to execute any one or more of the methods described herein. The instructions 908 transform the general, non-programmed machine 900 into a particular machine 900 programmed to carry out the described and illustrated functions in the manner described. The machine 900 may operate as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 908, sequentially or otherwise, that specify actions to be taken by the machine 900. Further, while only a single machine 900 is illustrated, the term "machine" shall also be taken to include a collection of machines that individually or jointly execute the instructions 908 to perform any one or more of the methodologies discussed herein. The machine 900, for example, may comprise the client device 102 or any one of a number of server devices forming part of the messaging server system 108. In some examples, the machine 900 may also comprise both client and server systems, with certain operations of a particular method or algorithm being performed on the server-side and with certain operations of the particular method or algorithm being performed on the client-side.

The machine 900 may include processors 902, memory 904, and input/output (I/O) components 938, which may be configured to communicate with each other via a bus 940. In an example, the processors 902 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 906 and a processor 910 that execute the instructions 908. The term "processor" is intended to include multi-core processors that may comprise two or more independent processors (sometimes referred to as "cores") that may execute instructions contemporaneously. Although FIG. 9 shows multiple processors 902, the machine 900 may include a single processor with a single-core, a single processor with multiple cores (e.g., a multi-core processor), multiple processors with a single core, multiple processors with multiples cores, or any combination thereof.

The memory 904 includes a main memory 912, a static memory 914, and a storage unit 916, all accessible to the processors 902 via the bus 940. The main memory 904, the static memory 914, and the storage unit 916 store the instructions 908 embodying any one or more of the methodologies or functions described herein. The instructions 908 may also reside, completely or partially, within the main memory 912, within the static memory 914, within a machine-readable medium within the storage unit 916, within at least one of the processors 902 (e.g., within the processor's cache memory), or any suitable combination thereof, during execution thereof by the machine 900.

The I/O components 938 may include a wide variety of components to receive input, provide output, produce output, transmit information, exchange information, capture measurements, and so on. The specific I/O components 938 that are included in a particular machine will depend on the type of machine. For example, portable machines such as mobile phones may include a touch input device or other such input mechanisms, while a headless server machine will likely not include such a touch input device. It will be appreciated that the I/O components 938 may include many other components that are not shown in FIG. 9. In various examples, the I/O components 938 may include user output components 924 and user input components 926. The user output components 924 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 926 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 938 may include biometric components 928, motion components 930, environmental components 932, or position components 934, among a wide array of other components. For example, the biometric components 928 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 930 include acceleration sensor components (e.g., accelerometer), gravitation sensor components, rotation sensor components (e.g., gyroscope).

The environmental components 932 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera, and a depth sensor, for example.

The position components 934 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 938 further include communication components 936 operable to couple the machine 900 to a network 920 or devices 922 via respective coupling or connections. For example, the communication components 936 may include a network interface component or another suitable device to interface with the network 920. In further examples, the communication components 936 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 922 may be another machine or any of a wide variety of peripheral devices (e.g., a peripheral device coupled via a USB).

Moreover, the communication components 936 may detect identifiers or include components operable to detect identifiers. For example, the communication components 936 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 936, such as location via Internet Protocol (IP) geolocation, location via Wi-Fi® signal triangulation, location via detecting an NFC beacon signal that may indicate a particular location, and so forth.

The various memories (e.g., main memory 912, static memory 914, and memory of the processors 902) and storage unit 916 may store one or more sets of instructions and data structures (e.g., software) embodying or used by any one or more of the methodologies or functions described herein. These instructions (e.g., the instructions 908), when executed by processors 902, cause various operations to implement the disclosed examples.

The instructions 908 may be transmitted or received over the network 920, using a transmission medium, via a network interface device (e.g., a network interface component included in the communication components 936) and using any one of several well-known transfer protocols (e.g., hypertext transfer protocol (HTTP)). Similarly, the instructions 908 may be transmitted or received using a transmission medium via a coupling (e.g., a peer-to-peer coupling) to the devices 922.

Software Architecture

Figure 10:
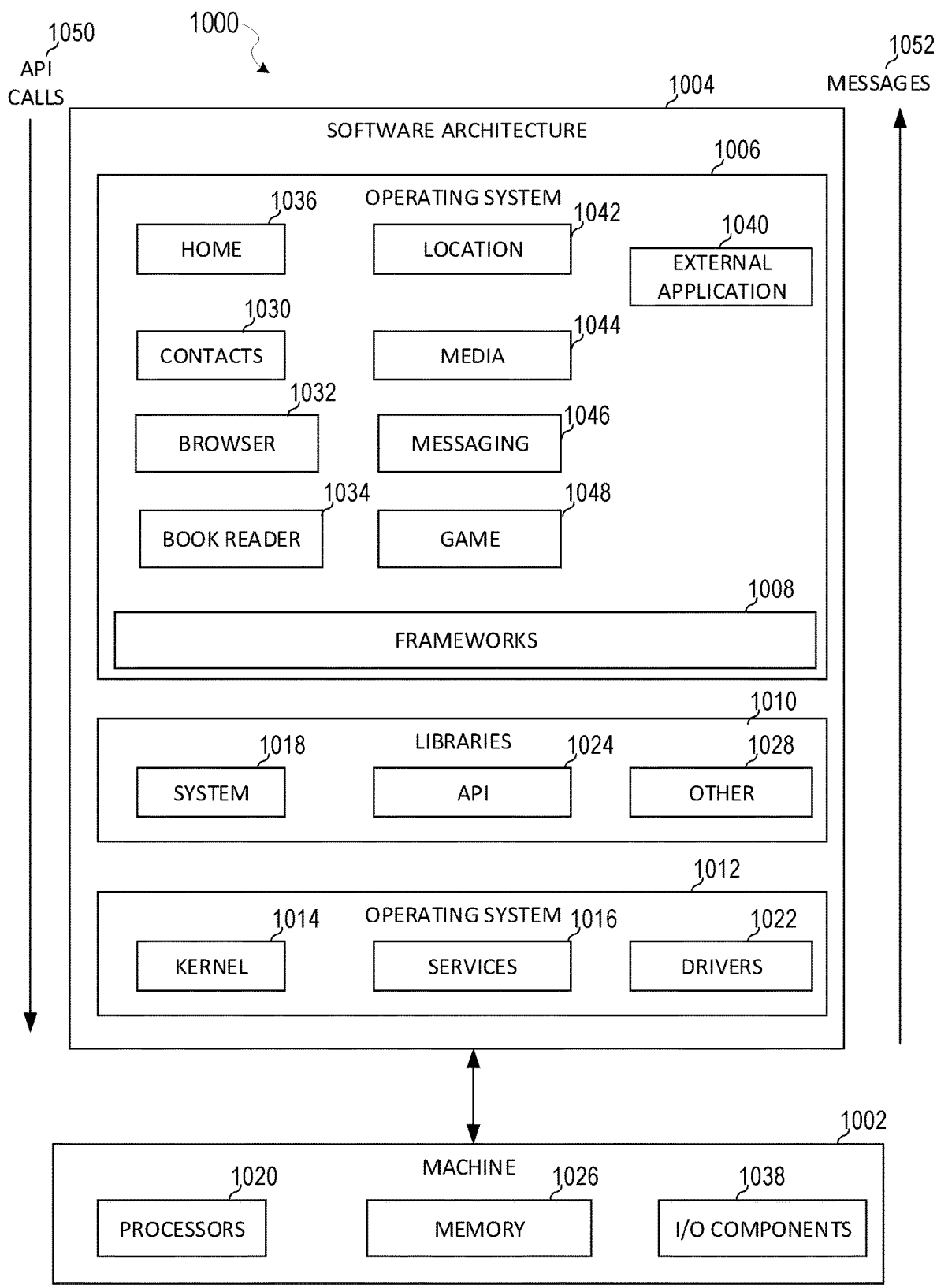
FIG. 10 is a block diagram showing a software architecture within which examples may be implemented.

FIG. 10 is a block diagram 1000 illustrating a software architecture 1004, which can be installed on any one or more of the devices described herein. The software architecture 1004 is supported by hardware such as a machine 1002 that includes processors 1020, memory 1026, and I/O components 1038. In this example, the software architecture 1004 can be conceptualized as a stack of layers, where each layer provides a particular functionality. The software architecture 1004 includes layers such as an operating system 1012, libraries 1010, frameworks 1008, and applications 1006. Operationally, the applications 1006 invoke API calls 1050 through the software stack and receive messages 1052 in response to the API calls 1050.

The operating system 1012 manages hardware resources and provides common services. The operating system 1012 includes, for example, a kernel 1014, services 1016, and drivers 1022. The kernel 1014 acts as an abstraction layer between the hardware and the other software layers. For example, the kernel 1014 provides memory management, processor management (e.g., scheduling), component management, networking, and security settings, among other functionality. The services 1016 can provide other common services for the other software layers. The drivers 1022 are responsible for controlling or interfacing with the underlying hardware. For instance, the drivers 1022 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1010 provide a common low-level infrastructure used by the applications 1006. The libraries 1010 can include system libraries 1018 (e.g., C standard library) that provide functions such as memory allocation functions, string manipulation functions, mathematic functions, and the like. In addition, the libraries 1010 can include API libraries 1024 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1010 can also include a wide variety of other libraries 1028 to provide many other APIs to the applications 1006.

The frameworks 1008 provide a common high-level infrastructure that is used by the applications 1006. For example, the frameworks 1008 provide various graphical user interface (GUI) functions, high-level resource management, and high-level location services. The frameworks 1008 can provide a broad spectrum of other APIs that can be used by the applications 1006, some of which may be specific to a particular operating system or platform.

In an example, the applications 1006 may include a home application 1036, a contacts application 1030, a browser application 1032, a book reader application 1034, a location application 1042, a media application 1044, a messaging application 1046, a game application 1048, and a broad assortment of other applications, such as an external application 1040. The applications 1006 are programs that execute functions defined in the programs. Various programming languages can be employed to create one or more of the applications 1006, structured in a variety of manners, such as object-oriented programming languages (e.g., Objective-C, Java, or C++) or procedural programming languages (e.g., C or assembly language). In a specific example, the external application 1040 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the external application 1040 can invoke the API calls 1050 provided by the operating system 1012 to facilitate functionality described herein.

GLOSSARY

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions.

Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 902 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

Changes and modifications may be made to the disclosed embodiments without departing from the scope of the present disclosure. These and other changes or modifications are intended to be included within the scope of the present disclosure, as expressed in the following claims.

What is claimed is:

1. A method comprising:
    receiving, by an interaction application, content from a given user;
    selecting a metric for measuring performance of the content on the interaction application;
    measuring performance of the content on the interaction application;
    computing a value of the measured performance of the content on the interaction application based on the selected metric;
    determining that the content is associated with a first feature of a plurality of features of the interaction application;
    applying a first weight to the value for the performance in response to determining that the content is associated with the first feature of the interaction application, wherein each of the plurality of features of the interaction application is associated with a respective weight to be applied to the computed value of the performance;
    determining that the content includes an augmented reality item that includes at least one of:
        a facial tracking response-based feature where augmented reality graphical elements are modified based on movement of a face depicted in one or more images captured by a user device; or
        a movement response-based feature where the augmented reality graphical elements are modified based on movement of the user device;
    selecting the first weight or a second weight to apply to a token count value that is computed based on use of the augmented reality item, the selecting being performed in response to determining that the augmented reality item includes at least one of the facial tracking response-based feature or the movement response-based feature;
    updating a restricted use token wallet stored in a profile for the given user based on the computed value of the performance of the content and the token count value; and
    generating, by the interaction application, a graphical user interface for presentation to the given user, the graphical user interface identifying a quantity of restricted use tokens associated with the restricted use token wallet for each of a plurality of types of content received from the given user, the graphical user interface comprising:
        a first region associated with a plurality of videos that presents one or more metrics for the plurality of videos and a first value of tokens the given user has earned from the plurality of videos;
        a second region associated with a plurality of augmented reality items that presents one or more metrics for the plurality of augmented reality items and a second value of tokens the given user has earned from the plurality of augmented reality items; and
        a third region associated with a plurality of games that presents one or more metrics for the plurality of games and a third value of tokens the given user has earned from the plurality of games.

2. The method of claim 1, wherein the interaction application comprises a messaging application, and wherein the content comprises a video submitted by the given user, further comprising:
    training a neural network to transform the video by detecting presence of an object within the video and modifying the object in the video to depict a graphical element in real time.

3. The method of claim 2, wherein the metric comprises a number of times the video has been viewed by other users on the messaging application, and wherein measuring performance comprises updating a view count value each time the content is viewed at least partially by a unique user of the messaging application.

4. The method of claim 2, wherein the metric comprises a quantity of advertisements that have been inserted into the video over a threshold period of time, and wherein measuring performance comprises updating an advertisement count value each time a new advertisement is associated with the content, wherein the new advertisement replaces a prior advertisement that was associated with the content.

5. The method of claim 2, wherein the metric further comprises a quantity of advertisements that have been viewed by other users of the messaging application while viewing the video, and wherein measuring performance comprises updating a view count value each time the advertisement associated with the video is viewed at least partially by a user of the messaging application.

6. The method of claim 1, wherein the metric further comprises a first metric for measuring a first type of performance of the content and a second metric for measuring a second type of performance of the content.

7. The method of claim 6, wherein the first type of performance comprises an attribute of the content and the second type of performance comprises an advertisement parameter.

8. The method of claim 7, wherein the attribute of the content identifies the content as an augmented reality element, a video, an audio clip, or content that uses a feature of the interaction application, and wherein the advertisement parameter indicates whether advertisements are associated with access to the content.

9. The method of claim 6, further comprising:
determining that the first type of performance of the given content indicates that the given content includes an augmented reality element;
determining that the second type of performance indicates that the given content is associated with an advertisement; and
computing, as the value for the given content, a first quantity based on determining that the content includes the augmented reality element that is associated with the advertisement.

10. The method of claim 9, further comprising:
receiving a second content from the given user; and
computing, as the value for the second content, a second quantity based on determining that the second content includes a video and is not associated with an advertisement, the second quantity being smaller than the first quantity.

11. The method of claim 1, wherein the value represents a revenue share between the interaction application and the given user.

12. The method of claim 1, wherein the metric comprises a measure representing rarity of the content.

13. The method of claim 1, wherein the content comprises a video and wherein the interaction application comprises a messaging application.

14. The method of claim 1, wherein the content comprises an augmented reality element submitted by the given user that can be applied to augment one or more images captured by client devices of other users of the interaction application.

15. The method of claim 14, wherein the metric comprises a quantity of times the augmented reality element has been used by the other users on the interaction application, and wherein measuring performance comprises updating a view count value each time the augmented reality element is used to modify one or more images captured by one of the other users.

16. The method of claim 14, wherein the metric comprises a type of feature included in the augmented reality element, further comprising:
applying the first weight to the value for the performance in response to determining that the augmented reality element includes a first type of feature, wherein each of a plurality of types of features of augmented reality element is associated with different weights to be applied to the computed value of the performance.

17. The method of claim 1, further comprising:
receiving input from the given user to exchange the restricted use token wallet for a given usage;
determining that the given usage satisfies an allowable usage criterion of the restricted use token wallet;
obtaining an exchange rate for the restricted use token wallet; and
exchanging one or more tokens stored in the restricted use token wallet for the given usage according to the exchange rate.

18. A system comprising:
a processor configured to perform operations comprising:
receiving, by an interaction application, content from a given user;
selecting a metric for measuring performance of the content on the interaction application;
measuring performance of the content on the interaction application;
computing a value of the measured performance of the content on the interaction application based on the selected metric;
determining that the content is associated with a first feature of a plurality of features of the interaction application;
applying a first weight to the value for the performance in response to determining that the content is associated with the first feature of the interaction application, wherein each of the plurality of features of the interaction application is associated with a respective weight to be applied to the computed value of the performance;
determining that the content includes an augmented reality item includes at least one of a facial tracking response-based feature where augmented reality graphical elements are modified based on movement of a face depicted in one or more images captured by a user device or a movement response-based feature where the augmented reality graphical elements are modified based on movement of the user device;
selecting the first weight or a second weight to apply to a token count value that is computed based on use of the augmented reality item, the selecting being performed in response to determining that the augmented reality item includes at least one of the facial tracking response-based feature or the movement response-based feature;
updating a restricted use token wallet stored in a profile for the given user based on the computed value of the performance of the content and the token count value; and
generating, by the interaction application, a graphical user interface for presentation to the given user, the graphical user interface identifying a quantity of restricted use tokens associated with the restricted use token wallet for each of a plurality of types of content received from the given user, the graphical user interface comprising:
a first region associated with a plurality of videos that presents one or more metrics for the plurality of videos and a first value of tokens the given user has earned from the plurality of videos;
a second region associated with a plurality of augmented reality items that presents one or more metrics for the plurality of augmented reality items and a second value of tokens the given user has earned from the plurality of augmented reality items; and
a third region associated with a plurality of games that presents one or more metrics for the plurality of games and a third value of tokens the given user has earned from the plurality of games.

19. The system of claim 18, the operations comprising:
receiving input from the given user to exchange the restricted use token wallet for a given usage;
determining that the given usage satisfies an allowable usage criterion of the restricted use token wallet;
obtaining an exchange rate for the restricted use token wallet; and
exchanging one or more tokens stored in the restricted use token wallet for the given usage according to the exchange rate.

20. A non-transitory machine-readable storage medium that includes instructions that, when executed by one or more processors of a machine, cause the machine to perform operations comprising:
receiving, by an interaction application, content from a given user;
selecting a metric for measuring performance of the content on the interaction application;
measuring performance of the content on the interaction application;
computing a value of the measured performance of the content on the interaction application based on the selected metric;
determining that the content is associated with a first feature of a plurality of features of the interaction application;
applying a first weight to the value for the performance in response to determining that the content is associated with the first feature of the interaction application, wherein each of the plurality of features of the interaction application is associated with a respective weight to be applied to the computed value of the performance;
determining that the content includes an augmented reality item includes at least one of a facial tracking response-based feature where augmented reality graphical elements are modified based on movement of a face depicted in one or more images captured by a user device or a movement response-based feature where the augmented reality graphical elements are modified based on movement of the user device;
selecting the first weight or a second weight to apply to a token count value that is computed based on use of the augmented reality item, the selecting being performed in response to determining that the augmented reality item includes at least one of the facial tracking response-based feature or the movement response-based feature;
updating a restricted use token wallet stored in a profile for the given user based on the computed value of the performance of the content and the token count value; and
generating, by the interaction application, a graphical user interface for presentation to the given user, the graphical user interface identifying a quantity of restricted use tokens associated with the restricted use token wallet for each of a plurality of types of content received from the given user, the graphical user interface comprising:
a first region associated with a plurality of videos that presents one or more metrics for the plurality of videos and a first value of tokens the given user has earned from the plurality of videos;
a second region associated with a plurality of augmented reality items that presents one or more metrics for the plurality of augmented reality items and a second value of tokens the given user has earned from the plurality of augmented reality items; and
a third region associated with a plurality of games that presents one or more metrics for the plurality of games and a third value of tokens the given user has earned from the plurality of games.

* * * * *